United States Patent
Fyke

(10) Patent No.: US 9,253,803 B2
(45) Date of Patent: Feb. 2, 2016

(54) MANAGING SHORT RANGE WIRELESS DATA TRANSMISSIONS

(75) Inventor: Steven Fyke, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 1240 days.

(21) Appl. No.: 12/954,186

(22) Filed: Nov. 24, 2010

(65) Prior Publication Data

US 2015/0056919 A1   Feb. 26, 2015

(51) Int. Cl.
H04B 7/00 (2006.01)
H04W 76/02 (2009.01)
H04W 4/00 (2009.01)
H04W 12/06 (2009.01)

(52) U.S. Cl.
CPC ............. *H04W 76/02* (2013.01); *H04W 4/008* (2013.01); *H04W 12/06* (2013.01)

(58) Field of Classification Search
CPC ..... H04W 12/06; H04W 88/04; H04W 84/18; H04W 4/008; H04W 76/005; H04W 36/00; H04W 8/186; H04W 8/205; H04W 8/26; H04W 12/04; H04W 24/00; H04W 36/0005
USPC ....................................................... 455/41.2
See application file for complete search history.

(56) References Cited

U.S. PATENT DOCUMENTS

| 7,484,008 | B1 | 1/2009 | Gelvin et al. | |
|---|---|---|---|---|
| 8,295,184 | B2 * | 10/2012 | Balasubramanian | H04L 41/5025 370/242 |
| 2003/0217179 | A1 | 11/2003 | Famolari et al. | |
| 2004/0097263 | A1 | 5/2004 | Katayama et al. | |
| 2004/0162108 | A1 | 8/2004 | Fu et al. | |
| 2005/0078608 | A1 | 4/2005 | Gluck | |
| 2005/0186907 | A1 | 8/2005 | Tailor | |

(Continued)

FOREIGN PATENT DOCUMENTS

EP   1 868 102   12/2007
WO   2006033034   3/2006

OTHER PUBLICATIONS

First Examiner's Report dated Oct. 6, 2014 for Canadian patent application No. 2,818,908.
Kiss Communications Technology Co., Ltd., Bluetooth handsfree car kit BTK-01, Jul. 23, 2010 (web page visited Jul. 23, 2010).
Kiss Communications Technology Co., Ltd., www.kaisstech.com., Jul. 23, 2010 (web page visited Jul. 23, 2010).
Bluetooth Repeater, Version 3, Specification, Jul. 23, 2010 (web page visited Jul. 23, 2010).

(Continued)

*Primary Examiner* — Ajibola Akinyemi
(74) *Attorney, Agent, or Firm* — Jon Gibbons; Fleit Gibbons Gutman Bongini & Bianco P.L.

(57) ABSTRACT

An apparatus and method for relaying short range communication data between electronic devices. In one example, a first and second short range wireless communication link is established with a first and second wireless communication device, respectively. The first wireless communication device maintains a wireless connection to a wireless telecommunications network. A first and second set of data is received from the first and second wireless communication devices over the first and second links, respectively. At least one of the first set of data and the second set of data is relayed to at least one of the second wireless communication device and the first wireless communication device, respectively, over the second and first links, respectively. The relaying forms a multi-party connection with the first wireless communication device and the second wireless communication device to the wireless telecommunications network.

16 Claims, 9 Drawing Sheets

(56) References Cited

U.S. PATENT DOCUMENTS

| | | |
|---|---|---|
| 2006/0034231 A1 | 2/2006 | Tailor |
| 2009/0061775 A1 | 3/2009 | Warren et al. |
| 2009/0080494 A1* | 3/2009 | Kurashima ........... H04B 7/2606 375/130 |
| 2009/0305633 A1 | 12/2009 | Warsta |
| 2010/0304674 A1* | 12/2010 | Kim ...................... H04W 76/02 455/41.2 |

OTHER PUBLICATIONS

Partial European Search Report dated Feb. 28, 2011 for European Application No. 10 19 2456.

* cited by examiner

| DEVICE ID | DEVICE TYPE | PASSCODE | AUTOMATIC PAIRING | ... |
|---|---|---|---|---|
| WCD_1 | CELLULAR PHONE | 0123 | YES | |
| WCD_2 | LAPTOP | 4567 | NO | |
| ... | ... | ... | ... | |
| WCD_N | CELLULAR PHONE | 8900 | YES | |

FIG. 3

MANAGING SHORT RANGE WIRELESS DATA TRANSMISSIONS

FIELD OF THE DISCLOSURE

The present disclosure generally relates to short range wireless data transmissions, and more particularly to managing short range wireless data transmissions.

BACKGROUND

Short range wireless data systems (SRWDSs) such as Bluetooth® systems have become increasingly popular over the last decade. One type of environment in which these systems are used is an automotive environment. In this environment, a user generally pairs an electronic device such as a cellular phone with the SRWDS. The user can then, for example, transmit audio to and from the cellular device utilizing the SRWDS. However, many automotive manufacturers utilize different SRWDSs. Therefore, a pairing procedure that the user has become accustomed to for one automobile may not apply to another automobile. This can be very frustrating for the user. Additionally, many of these conventional SRWDSs usually only allow one electronic device to utilize the functionality of the system at one time.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which:

FIG. 3 illustrates wireless communication device pairing data according to one example;

DETAILED DESCRIPTION

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the disclosed subject matter in virtually any appropriately detailed structure and function. Further, the terms and phrases used herein are not intended to be limiting, but rather, to provide an understandable description.

The terms "a" or "an", as used herein, are defined as one or more than one. The term plurality, as used herein, is defined as two or more than two. The term another, as used herein, is defined as at least a second or more. The terms "including" and "having" as used herein, are defined as comprising (i.e. open language). The term "coupled" as used herein, is defined as "connected" although not necessarily directly, and not necessarily mechanically.

The term "wireless communication device" is intended to broadly cover many different types of devices that can wirelessly receive signals, and in most cases can wirelessly transmit signals, and may also operate in a wireless communication system. For example, and not for any limitation, a wireless communication device can include any one or a combination of the following: a two-way radio, a cellular telephone, a mobile phone, a smartphone, a two-way pager, a wireless messaging device, a laptop/computer, a personal digital assistant, and other similar devices.

Described below are systems and method for relaying short range communication data between electronic devices. In one example, a portable short range wireless communication device establishes a first short range wireless communication link with a first wireless communication device. The first wireless device maintains a wireless connection to a wireless telecommunications network. A second short range wireless communication link is established with at least a second wireless communication device. At least one of a first set of short range wireless communication data and a second set of short range wireless communication data is received from the first and second wireless communication devices, respectively, over the first and second short range wireless communication links, respectively. At least one of the first set of short range wireless communication data and the second set of short range wireless data is relayed to the second and first wireless communication devices, respectively, over the second the first short range wireless communication links, respectively. This relaying forms a multi-party connection with the first wireless communication device and the second wireless communication device to the wireless telecommunications network.

Operating Environment

Figure 1:
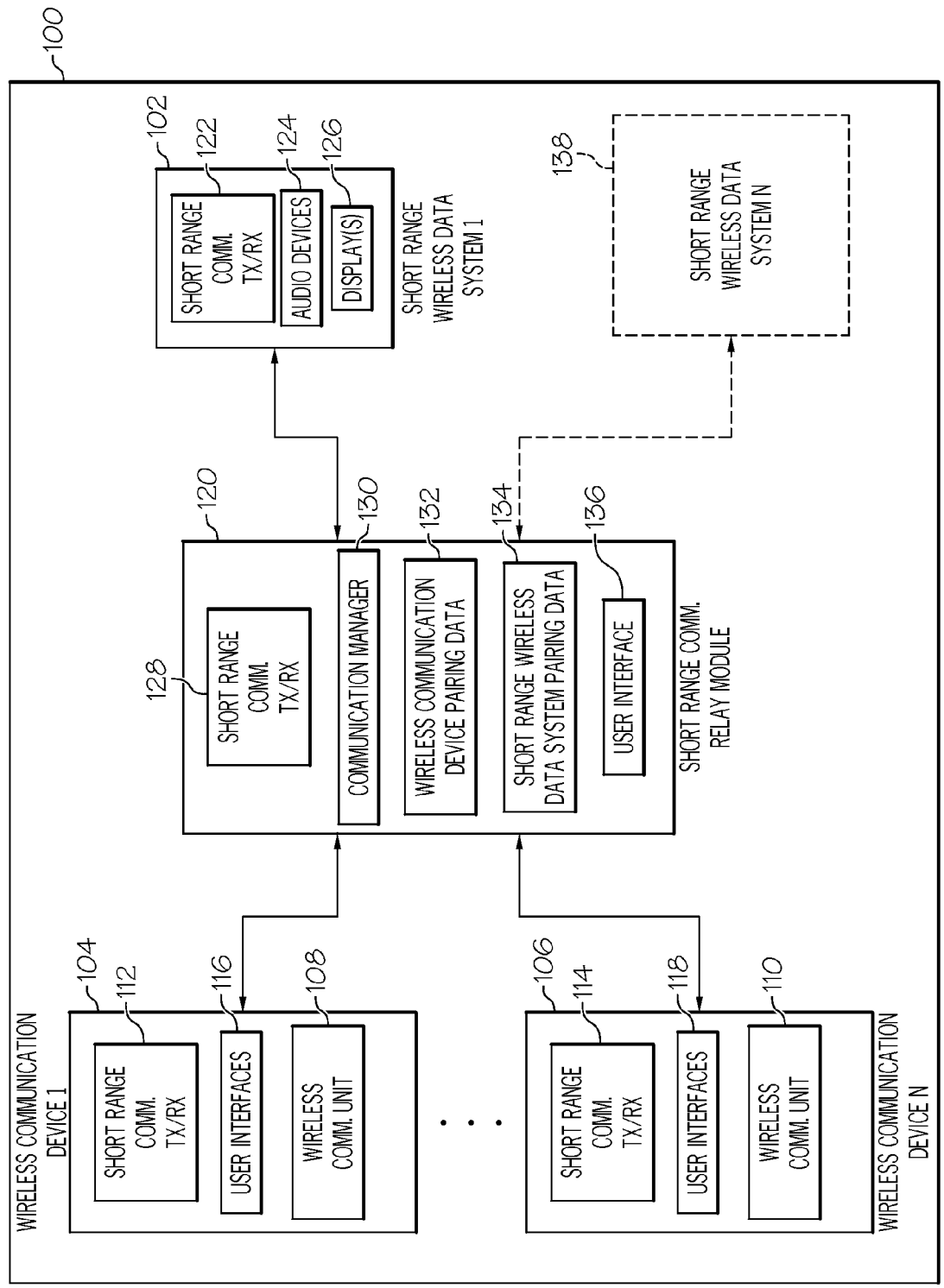
FIG. 1 is a block diagram of an operating environment according to one example.

FIG. 1 is a block diagram illustrating one operating environment for communication over a SRWDS according to one example. In particular, FIG. 1 shows an operating environment 100 such as, but not limited to, an automobile comprising a SRWDS 102. It should be noted that an automobile is only one example of an applicable environment as any environment comprising a SRWDS can be used as an operating environment as well. A SRWDS 102 can be any type of short range communication system such as, but not limited to, a Bluetooth® system, a Zigbee® system, or the like. Alternatively, the operating environment 100 is not required to include an SRWDS 102. For example, the operating environment 100 can be an office, a conference room, outdoors, or any other environment as well.

The operating environment 100 comprises a plurality of electronic devices such as wireless communication devices

104, 106. Each wireless communication device 104, 106 comprises a communication subsystem 108, 110 that allows the device to communicate over one or more wireless communication networks. For example, the wireless communication devices 104, 106 can each communication over wireless communication network(s) such as a Code Division Multiple Access (CDMA); a Time Division Multiple Access (TDMA), a Global System for Mobile Communications (GSM), a General Packet Radio Service (GPRS), an Evolution Data Only (EV-DO), a Universal Mobile Telecommunications System (UMTS), an Integrated Dispatch-Enhanced Network (iDEN), a Frequency Division Multiple Access (FDMA), other IEEE 802.16 standards, an Orthogonal Frequency Division Multiplexing (OFDM), an Orthogonal Frequency Division Multiple Access (OFDMA), an LTE, a UMB, a Wireless LAN (WLAN), and/or a WiMax based network.

Each wireless communication device 104, 106 also comprises a short range communication transceiver 112, 114. The short range communication transceiver 112, 114 allows the wireless communication devices 104, 106 to send and receive data over a SRWDS system such as, but not limited to a Bluetooth® system, a Zigbee® system, or the like utilizing radio frequencies. It should be noted that the short range communication transceiver 112, 114 can also be part of the communication subsystem 108, 110 as well. The wireless communication devices 104, 106 also comprises a set of user interfaces 116, 118 such as, but not limited to, a speaker(s), a microphone(s), a keyboard(s), a display(s), a touch-screen, a camera, and the like.

The wireless communication devices 104, 106 are communicatively coupled to the SRWDS 102 via an electronic device such as a short range communication relay module (SRCRM) 120. The SRWDS 102 comprises a short range communication transceiver 122 that allows data to be transmitted and received from other devices over a short range communication network. The SRWDS 102 also comprises audio devices 124 such as speakers and microphones for transmitting and receiving audio data. The system 102 can also comprise a display 126 for presenting data and interacting with a user in the environment 102.

The SRCRM 120 comprises a short range communication transceiver 128, a communication manager 130, wireless communication device pairing data 132, SRWDS pairing data 134, and optional user interfaces 136. The SRCRM 120 may be a portable device that automatically couples the wireless communication devices 104, 106 to the short range communication system 102 and relays wireless data such as, but not limited to, audio data from the wireless communication devices 104, 106 to the SRWDS 102 and vice versa. Alternatively, the SRCRM 120 may be integrated within another component such as the short range wireless data system 102. This allows, among other things, multiple wireless communication devices 104, 106 to interact with the short range wireless data system 102 at the same time. As will be discussed in more detail below, the SRCRM 120 also relays wireless data from one or more wireless communication devices 104 communicatively coupled (e.g., paired) to the SRCRM 120 to one or more other wireless communication devices 106 communicatively coupled to the SRCRM 120. The functions and operations of the SRCRM 120 are discussed in greater detail below.

The short range communication transceiver 128 of the SRCRM 120 transmits and receives radio frequency waves. This transceiver 128 establishes a first short range wireless communication (SRWC) link between itself and a wireless device 104, 106 and a second SRWC link between itself and the SRWDS 102. The SRCRM 120 utilizes these SRWC links to simultaneously couple the SRCRM 120 to the wireless communication devices 104, 106 and the short range wireless data system 102, thereby coupling the devices 104, 106 to the SRWDS 102. However, it should be noted that in various other embodiments the SRCRM 120 only establishes links between the wireless devices 104, 106 and not a SRWDS 102. In other words, the SRWDS 102 is not required in one or more embodiments of the present invention. The wireless communication device pairing data 132 comprises pairing data for each of the wireless communication device so that SRCRM 120 and the devices 104, 106 can be automatically paired with each other without a user having to manually enter pairing information each time the user wants to couple a device 104 to the SRCRM 120.

The SRWDS pairing data 134 comprises pairing data that allows the SRCRM 120 to be automatically coupled with a plurality of different SRWDS. For example, this data 134 can comprise pairing information that allows the SRCRM 120 to pair with a SRWDS in a Ford manufactured automobile, a Toyota manufactured automobile, a Honda manufactured automobile, and the like. These various SRWDSs are illustrated by the SRWDS_1 102 and the SRWDS_N 138 shown in FIG. 1. It should be noted that the SRCRM 120 is not required to maintain pairing information for wireless communication devices and SRWDS as this information can be manually entered each time pairing is desired.

The communication manager 130 manages the short range communications between the SRCRM 120 and the wireless devices 104, 106; the SRCRM 120 and the SRWDS 102; and the wireless devices 104, 106 and the SRWDS 102. The communication manager 130 also manages the pairing/coupling of the wireless communication devices 104, 106 and the SRWDS 102 to the SRCRM 120.

The optional user interface(s) 136 of the SRCRM 120 can include a display, a keyboard, a speaker, and/or any other interface that allows a user to interact with the SRCRM 120. The optional user interface(s) 136 allows a user to enter pairing information and/or SRCRM settings/options information directly into the SRCRM 120 as compared to using the wireless communication devices 104, 106. Each of the above components of the SRCRM 120 is discussed in greater detail below. It should be noted that although the SRCRM 120 is shown as a standalone module in FIG. 1, the SRCRM 120 can also be implemented within a wireless communication device 104, 106 or the SRWDS 102 as well.

Managing Short Range Wireless Communications Via the SRCRM

As discussed above, many conventional SRWDSs 102 utilize different pairing procedures that can make pairing a wireless communication device to each of these systems difficult and frustrating. For example, users who rent automobiles may encounter many different types of automobiles, each having their own SRWDS requiring a different pairing method. In addition, conventional SRWDSs generally only allow one wireless communication device to actively participate on a call. As will be discussed in greater detail below, the SRCRM 120 overcomes these problems by automatically coupling a user's wireless communication device to an SRWDS 102 of the environment 100, such as an automobile. The user, at most, only needs to remember how to pair his/her device with the SRCRM 120 (this pairing process can also be performed automatically once an initial pairing procedure is performed) and is not required to manually pair the device with the SRWDS 102. This allows for easy pairing of one or more handsets from one hands free environment of a first vehicle to another hands free environment a second vehicle. A user is not required to know or remember multiple pairing procedures when switching cars or renting a car.

In addition, the SRCRM 120 couples wireless devices with each other. This allows for wireless data such as audio from the wireless communication devices 104, 106 to be relayed to each other and also to the SRWDS 102 and vice versa. If one of the devices has established a communication link with another communication device such as a landline device, a VoIP device, or another wireless device, data from this communication link can be sent to another wireless device via the SRCRM 120. This allows a formation of a multiparty call on a telecommunication network using local short-range wireless communication. Two or more users in a conference room, an automobile (or other vehicle), or other environment can share a single telecommunications link as a multiparty call by sharing voice and data over short range wireless. This embodiment reduces the use of minutes and cell tower usage. Also, the individual handset controls, such as volume and mute, can be used during the call as compared to the controls of a handsfree speaker system. Another advantage is that wireless communication devices 104, 106 can be used rather than a speaker phone, which can pickup undesirable background noise and echoes.

A further advantage is that users in a multiparty call can each use the microphone and speaker of their wireless communication device 104, 106. This is especially important in a noisy hands free operation environment or other environment where one or more of the participants are not near a microphone or speaker, such as a car.

These embodiments as well as other embodiments are discussed in greater detail below.

The following is a more detailed discussion of managing short range wireless data transmissions utilizing the SRCRM 120. It should be noted that even though the following discussion uses an automobile as one example of an operating environment, any type of environment that provides a SRWDS is applicable hereto. It should also be noted that audio data is only one example of data that can be managed by the SRCRM 120. Other types of data may include textual data and video data.

Figure 2:
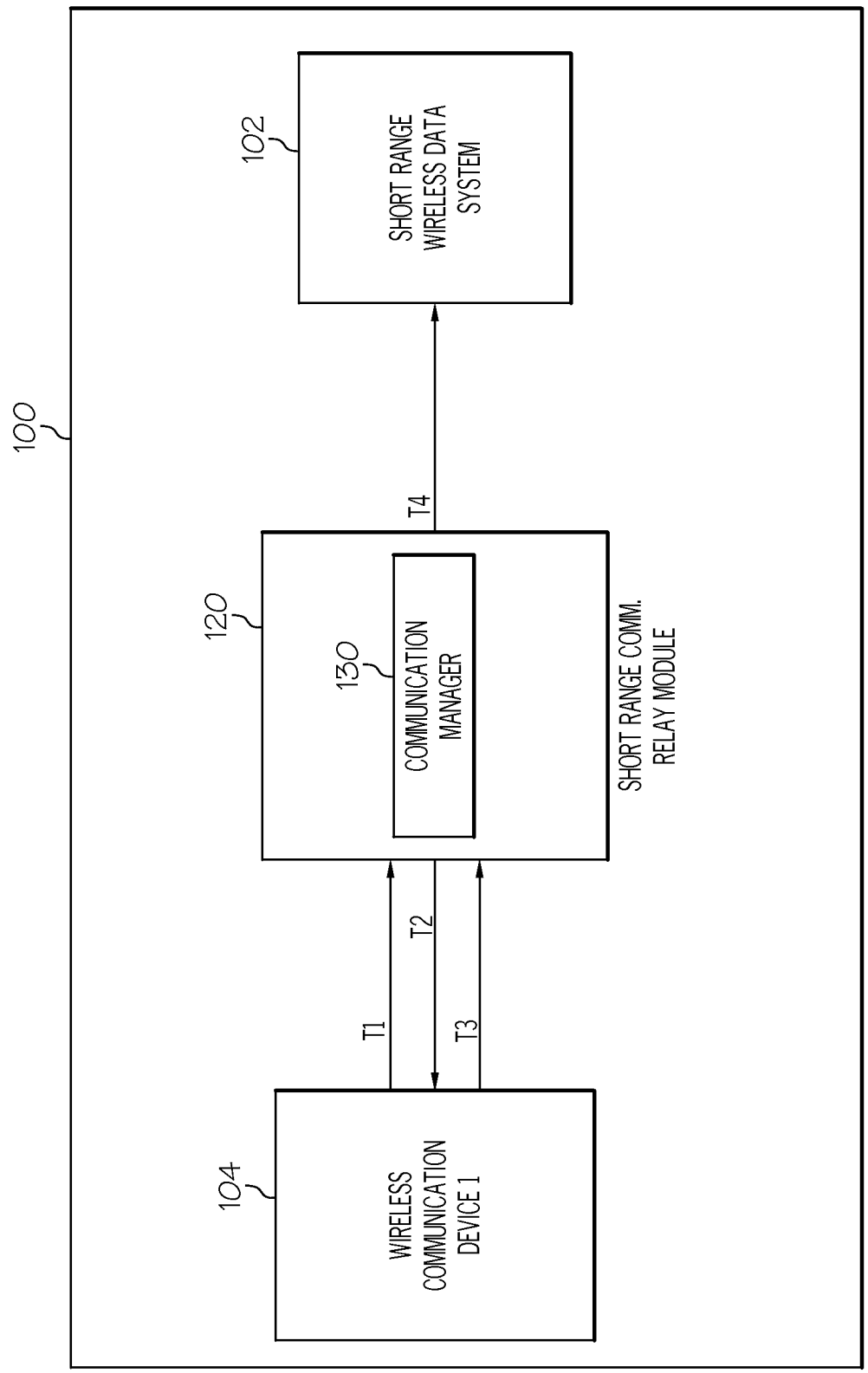
FIG. 2 is a functional timing diagram for communicatively coupling wireless communication devices with a short range communication system using a short range communication relay electronic device illustrated in FIG. 1 according to one example.

FIG. 2 is a functional timing diagram illustrating one example of pairing one or more wireless communication devices 104, 106 to a SRWDS 102 via the SRCRM 120. It should be noted that the sequence of operations shown in FIG. 2 is only used as an illustrative example. Also, the SRCRM 120 can establish links between the wireless communication devices 104, 106 and not the SRWDS 102. Also, the user and/or wireless device 104, 106 can interact with the SRCRM 120 either within the environment 100 or outside the environment 100. For example, the SRCRM 120 can comprise a portable power source that allows it to be used anywhere. Alternatively, the SRCRM 120 can be configured to accept a power source from within the environment 100 in addition to or instead of the portable power source.

One or more wireless communication devices 104 at T1 initiate a wireless communication link with the SRCRM 120. For example, when the wireless communication device 104 detects the SRCRM 120 it can notify the user via the user interface 116 that the SRCRM 120 has been detected. The user is then able to initiate a pairing process with the SRCRM 120 via the user interface 116. Alternatively, this pairing process can be automatically initiated by either the wireless communication device 104 when the SRCRM 120 is detected or by the SRCRM 120 when it detects the wireless device 104.

The SRCRM 120 at T2 requests pairing information such as a passcode and optional information such as a desired connection identifier or the like. The user is then able to enter the requested pairing information via the user interface 136 of the SRCRM 120. The wireless communication device 104 at T3 sends the requested pairing information to the SRCRM 120. It should be noted that if the SRCRM 120 initiates the pairing process with the device 104 then the wireless communication device 104, in this example, requests the pairing information. Once the SRCRM 120 receives the pairing information (or transmits the pairing information to the wireless communication device 104) the SRCRM 120 stores this pairing information in the wireless communication device pairing data 132 and establishes a first SRWC link with the wireless communication device 104 based on this pairing information.

It should be noted that if the wireless communication device 104 has been previously paired with the SRCRM 120 an automatic pairing process can be performed. For example, once the device 104 and the SRCRM 120 at T1 have detected each other, the SRCRM 120 can analyze its wireless communication device pairing data 132 to identify the pairing information required to pair with the device 104. The SRCRM 120 can then use this pairing information to automatically establish the first SRWC link between itself and the wireless communication device 104.

FIG. 3 shows one example of wireless communication device pairing data 132 maintained by the SRCRM 120. In particular, FIG. 3 shows a table 300 comprising a plurality of columns and rows. A first column 302, labeled "Device ID", comprises a set of entries that comprises device identifiers that uniquely identify wireless devices (an optionally SRWDS 102, 138) that have been previously paired with the SRCRM 120. For example, a first entry 304 under the "Device ID" column 302 includes a "WCD_1" identifier. The device identifier entries allow the SRCRM 120 to identify a given device's pairing information and to determine whether a device has previously been paired with the SRCRM 120.

A second column 306 labeled "Device Type" comprises a set of entries that identify the type of device associated with the respective pairing information. For example, a first entry 308 under the "Device Type" column 306 indicates that the device associated with the pairing information in the first row 310 of the table 300 is a cellular phone. The device type information can be used by the SRCRM 120 to determine a specific pairing procedure to use (if needed) based on the device type when automatically pairing with the wireless communication device 104.

A third column 312 labeled "Passcode" comprises a set of entries that identify the passcode to use for pairing a given device to the SRCRM 120. For example, a first entry 314 under the "Passcode" column 312 indicates that a passcode of 0123 is to be used when pairing the WCD_1 device to the SRCRM 120. A fourth column 316 labeled "Automatic Pairing" comprises a set of entries that indicate whether the SRCRM 120 is to automatically pair with a given device. For example, a first entry 318 under the "Automatic Pair" column 316 indicates that the SRCRM 120 is to automatically pair with the wireless communication device 104 identified as WCD_1. The SRCRM 120 uses the information such as the Passcode information within the table 300 to perform this automatic pairing process.

For example, after an initial pairing process has been completed and the pairing information has been stored, each time the SRCRM 120 detects the WCD_1 device (or vice versa) the SRCRM 120 automatically pairs with this device without any user intervention. The SRCRM 120 can also be configured to prompt the user to allow the automatic pairing to occur. It should be noted that one or more additional columns can be added and/or removed from the table 300 shown in FIG. 3. It should also be noted that the user can directly enter wireless device pairing information into the SRCRM 120 via the optional user interface(s) 136. This allows a user to setup the SRCRM 120 to automatically pair with a wireless device without having to first manually pair the wireless device to the SRCRM 120.

Returning to FIG. 2, the SRCRM 120 at T4 detects the SRWDS 102 within the environment 100 and initiates a pairing process between the SRCRM 120 and the SRWDS 102 (or vice versa). For example, the SRCRM 120, among other things, can query the SRWDS 102 to obtain a unique identifier of the SRWDS 102. Additionally, in an automobile or other similar environment, the SRCRM 120 can also query the SRWDS 102 to determine the manufacturer of the automobile, the model of the automobile, and the like. Once the SRCRM 120 obtains this information, it references the SRWDS pairing data 134 to automatically establish a second SRWC link with the SRWDS 102. It should be noted that the SRCRM 120 can establish a link with the wireless communication device 104 first and then the SRWDS 102 or vice versa.

Figure 4:
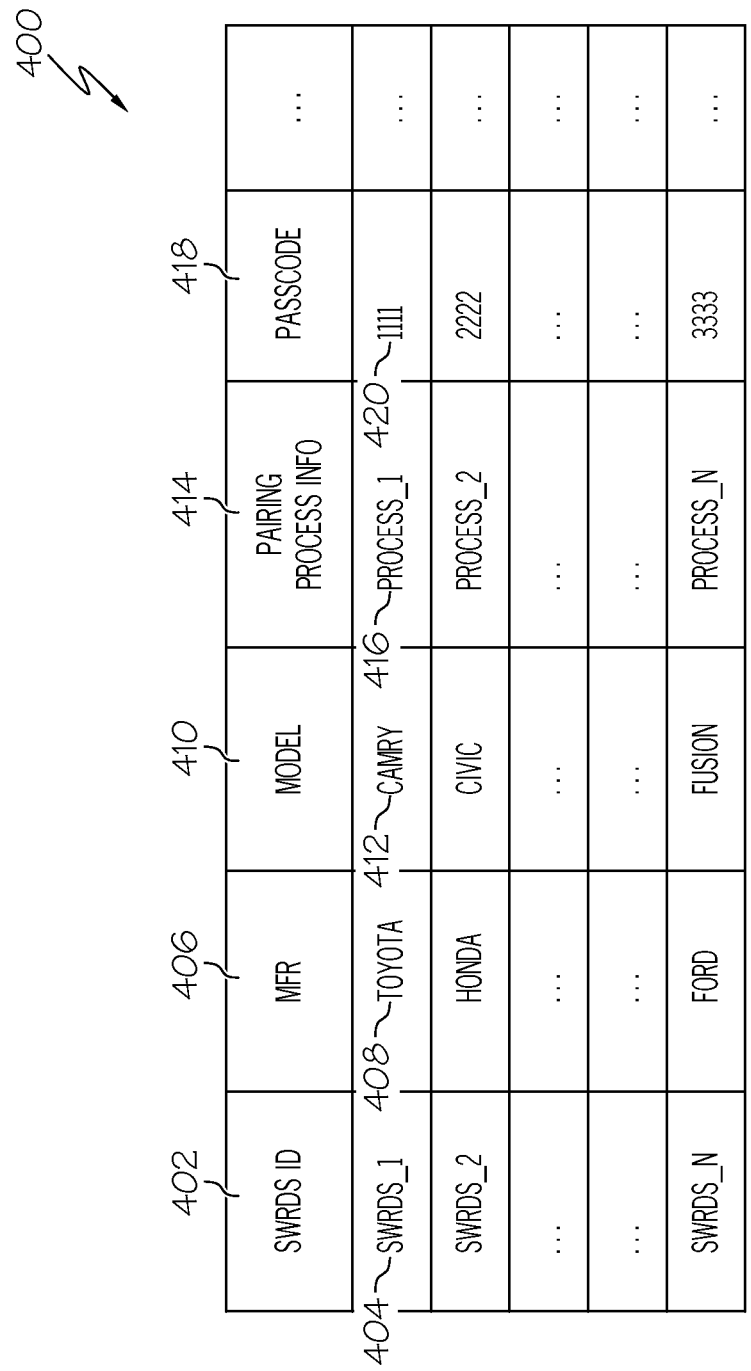
FIG. 4 illustrates short range communication system pairing information according to one example.

FIG. 4 shows one example of the SRWDS pairing data 134 maintained by the SRCRM 120. In particular, FIG. 4 shows a table 400 that comprises a plurality of columns and rows. A first column 402 labeled "SRWDS ID" comprises a set of entries that comprise SRWDS identifiers that uniquely identify a SRWDS. For example, a first entry 404 under the "SRWDS ID" column 402 includes a "SRWDS_1" identifier that uniquely identifies the SRWDS 102 of FIG. 1. The SRWDS identifier entries allow the SRCRM 120 to identify a given SRWDS's pairing information for automatically pairing with the system.

A second column 406 labeled "MFR" comprises a set of entries that identify the manufacturer of the environment, which in this example is an automobile. For example, a first entry 408 under the "MFR" column 406 indicates that Toyota manufactured the automobile comprising the SRWDS 102 associated with the SRWDS_1 identifier. The manufacturer information can be used by the SRCRM 120 to determine a specific pairing procedure to use (if needed) based on the manufacturer when automatically pairing with the SRWDS 102.

A third column 410 labeled "Model" comprises a set of entries that identify the specific model of the environment. For example, a first entry 412 under the "Model" column 410 indicates that the automobile is a Camry model. The model information can be used by the SRCRM 120 to determine a pairing procedure to use (if needed) that is specific to the model when automatically pairing with the SRWDS 102. A fourth column 414 labeled "Pairing Process Info" comprises a set of entries that include various pairing procedures for the given SRWDS 102. For example, a first entry 416 under the "Pairing Process Info" column 414 indicates a "Process_1". Since the SRWDS 102 is associated with a Toyota Camry, "Process_1" can include instructions/procedures and data for pairing with the SRWDS 102 as required by Toyota in general and/or for the specific model Camry as well. This "Pairing Process Info" can include any information that is required by the SRCRM 120 to initiate and establish a short range wireless communication link with the SRWDS 102. A fifth column 418 labeled "Passcode" comprises a set of entries that identify the passcode to use for pairing a given SRWDS 102 to the SRCRM 120. For example, a first entry 420 under the "Passcode" column 418 indicates that a passcode of 1111 is to be used when pairing the SRWDS 102 to the SRCRM 120. It should be noted that one or more additional columns can be added and/or removed from the table 400 shown in FIG. 4.

It should also be noted that the SRCRM 120 can be pre-populated with the short range communication system pairing data 134 and/or this data can be manually entered and stored within the SRCRM 120. For example, in a rental car environment the rental car company may have changed various settings of the SRWDS 102. Therefore, any pairing data obtained from the manufacturer may no longer be applicable to the SRWDS. In this example, the rental car company can manually enter their pairing data into the SRWDS, which stores this data into the SRWDS pairing data 134. This allows the SRCRM 120 to automatically maintain a link with the SRWDS 102.

Returning to FIG. 2, once the SRCRM 120 has established a first link between the wireless communication device(s) 104 and a second link between the SRWDS 102, the communication manager 130 of the SRCRM 120 relays wireless data between the wireless communication device(s) 104 and the SRWDS 102 as will be discussed in greater detail below.

Figure 5:
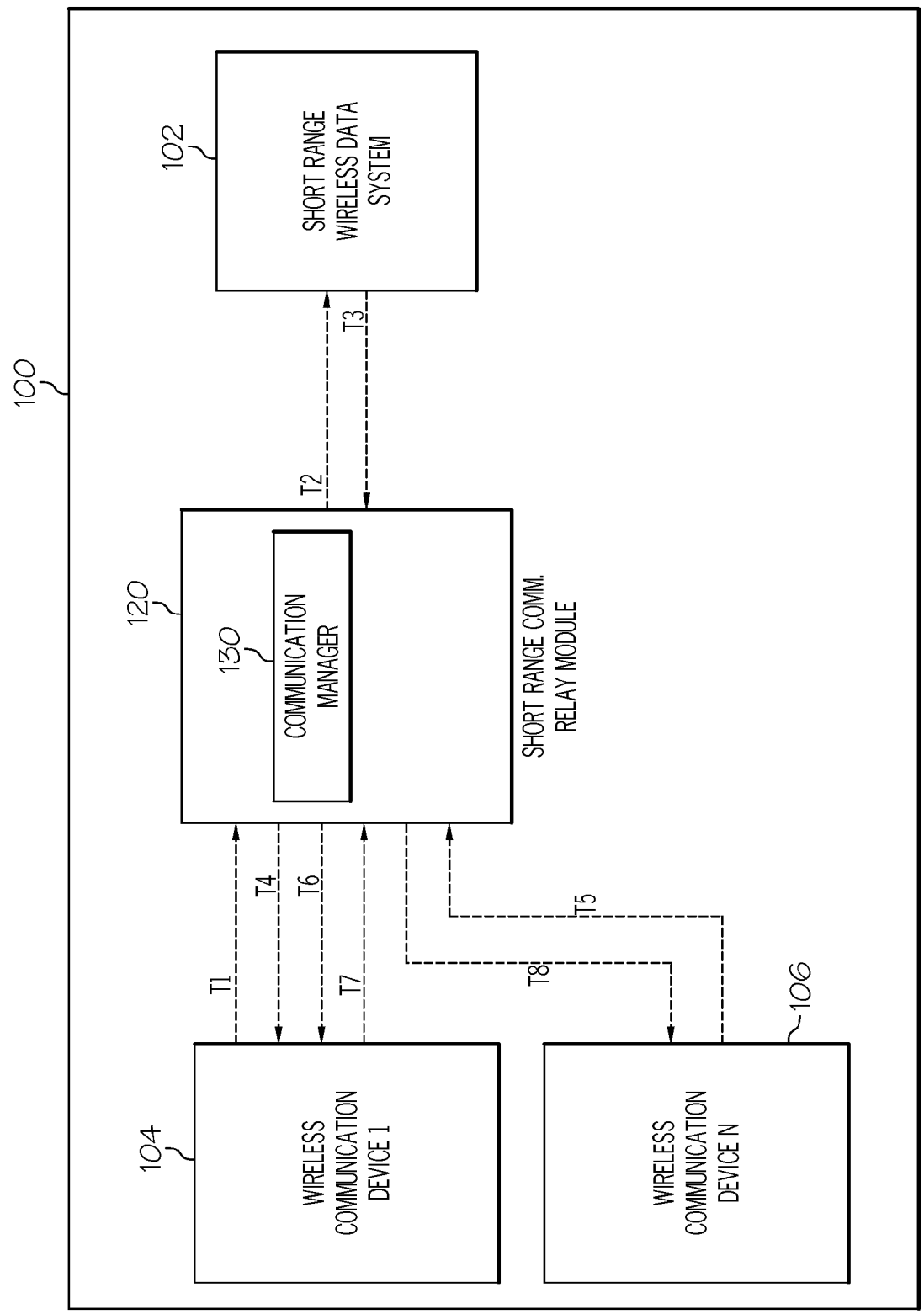
FIG. 5 is a functional timing diagram for relaying short range communications between a one or more wireless communication devices and/or a short range communication system according to one example.

FIG. 5 is a functional timing diagram illustrating one example of relaying wireless communication data between a first wireless communication device, one or more additional wireless communication devices, and the SRWDS 102. It should be noted that the sequence of operations shown in FIG. 5 is only one applicable example. It should be noted that the wireless communication devices 104, 106 and the SRWDS 102 in FIG. 5 have been paired with the SRCRM 120 based on the processed discussed above with respect to FIGS. 1-4. In this example, a first SRWC link has been established between the first wireless communication device 104 and the SRCRM 120; a second SRWC link has been established between the second wireless communication device 106 and the SRCRM 120; and a third optional SRWC link has been established between the SRWDS 102 and the SRCRM 120. However, this third link is not required. Also, the environment 100 may not comprise a SRWDS 102. In such a scenario, the SRCRM 120 only establishes links between itself and the wireless communication devices 104, 106.

The first wireless communication device 104 establishes a wireless communication link with another device via a wireless communication network such as a cellular network. Audio data such as the audio received from the other device at T1 is transmitted from the wireless communication device 104 to the SRCRM 120 via the first SRWC link. The SRCRM 120 receives this audio data and at T2 sends (e.g., relays) this received audio data to the SRWDS 102 via the second SRWC link. The SRWDS 102 then transmits this audio data through one of the audio devices 124 such as a speaker. Alternatively, if a link is not established with a SRWDS 102, the received audio data may be transmitted to the second wireless communication device 104. In addition, the SRWDS 102 at T3 receives audio data through an audio device 124, such as a microphone, and transmits this data to the SRCRM 120 via the second SRWC link. The SRCRM 120 receives this audio data and at T4 sends (e.g., relays) this received audio data to the wireless communication device 104 via the first SRWC link to be transmitted to the other device through the wireless communication network.

The SRCRM 120, via the communication manager 130, determines that one or more additional wireless communication devices such as the second wireless communication device 106 are to join the current call between the first device 104 and the other device. For example, the user of the second wireless communication device 106 can indicate through the user interface 118 that he/she wants to join the call. Alternatively, the first wireless communication device 104 can act as a master device and select, via the user interface 116, any other wireless communication device coupled to the SRCRM 120. The first wireless communication device 104 can also instruct the SRCRM 120 to begin relaying wireless communication data received by the first wireless communication device 104 from the other device to the second wireless communication device 106.

The SRCRM 120 at T5, in response to determining that the second wireless communication device 106 is to join the call, receives audio data from the second wireless communication device 106. For example, the user of the second wireless communication device 106 speaks into the microphone of the device 106. This audio data is transmitted from the second wireless communication device 106 to the SRCRM 120 via the second SRWC link. Alternatively, the SRCRM 120 begins to transmit the wireless communication data being received by the first wireless communication device 104 from the other device to the second wireless communication device 106.

The SRCRM 120 at T6 transmits (e.g., relays) the received audio data to the first wireless communication device 104 so that it can transmit the audio from the second wireless communication device 106 to the other device using the wireless communication link currently established between the first wireless communication device 104 and the other device. It should also be noted that data received from the second wireless communication device 106 can also be relayed to the SRWDS 120 as well. This relaying from a multi-party connection between the first and second wireless communication devices 104, 106 and the other device through the cellular or other telecommunications network. In addition, the user of the other device and the user of the second wireless communication device 106 may want to have a private conversation. This can be indicated either by the first wireless communication device 104 or the second wireless communication 106 selecting, for example, a "private" option on the user interface 116, 118.

The SRCRM 120 at T7, in response to determining that a "private" option has been selected, receives audio data from the first wireless communication device 104 corresponding to the other device. The SRCRM 120 at T8 transmits this received audio data to the second wireless device 106, which then transmits the audio data through one or more of the user interfaces 118. Any audio data received by the SRCRM 120 from second wireless device 106 during this "private" option is transmitted to the first wireless communication device similar to that already discussed above. As can be seen in this "private" option, the SRWDS 102 (if connected to the SRCRM 120) is bypassed and wireless data is transmitted between the wireless communication devices 104, 106 and the SRCRM 120. Alternatively, the "private' option can also disable the speaker/microphone on one of the wireless communications device 104, 106. This partially disabled wireless communication device acts as a transport vessel to the other wireless communication device. For example, if second wireless communication device 106 does not have coverage in a particular area (or the first wireless communication device 104 has better rates) and needs to transfer local data to a given destination, the SRCRM 120 can disable portions of the user interface, such as the speaker/microphone, at the first wireless communication device 104 and use the first wireless communication device 104 to transmit the data stored locally at the second wireless communication device 106.

Figure 6:
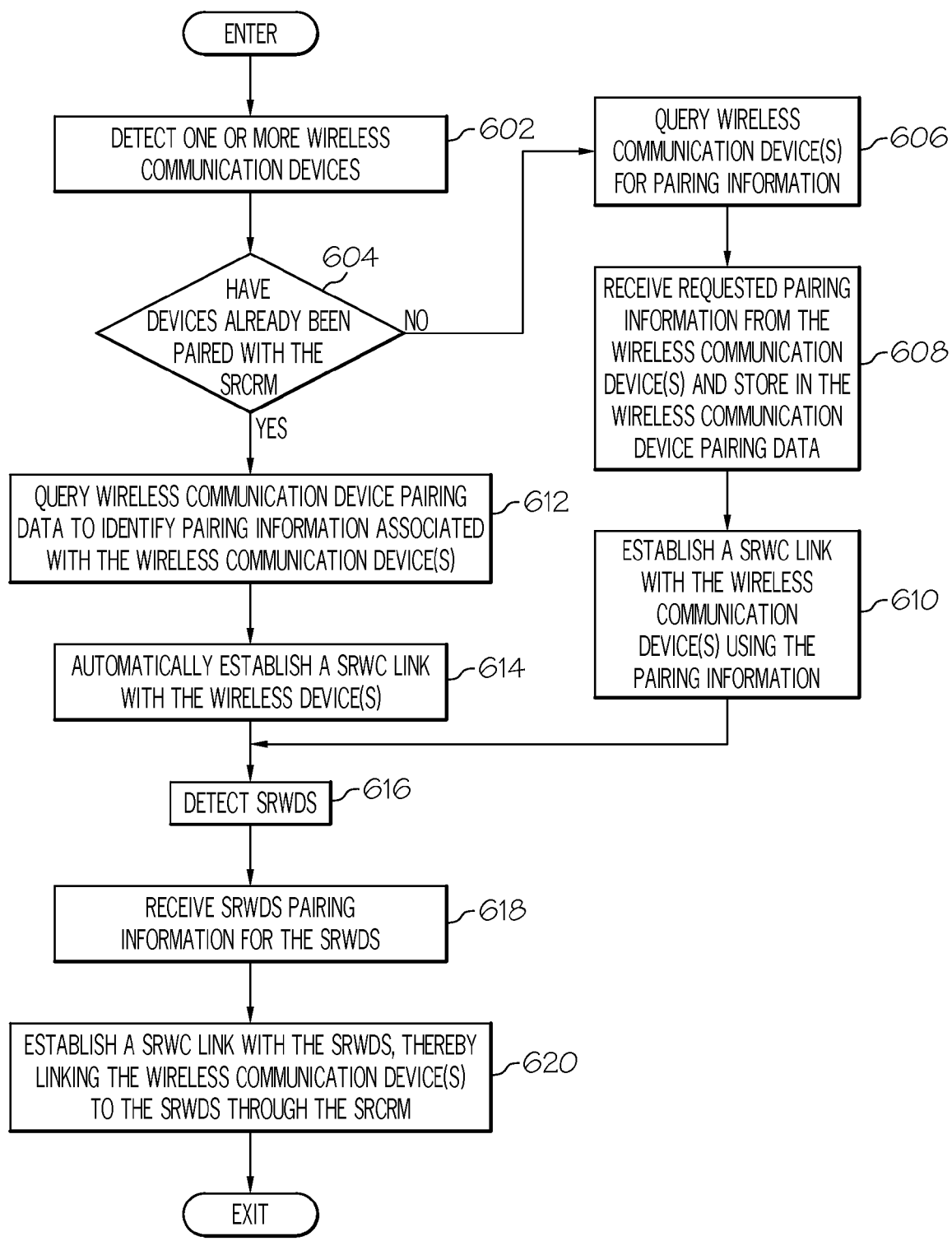
FIG. 6 is a flow diagram for a short range wireless communication pairing process performed by the short range communication relay electronic device illustrated in FIG. 1.

FIG. 6 is a flow diagram for a short range wireless communication pairing process 600. The short range wireless communication pairing process 600 automatically pairs one or more wireless communication devices 104, 106 with the SRCRM 120 and the SRCRM 120 with a SRWDS 102 as discussed above with respect to FIGS. 1-5. The short range wireless communication pairing process 600 is performed by the communication manager 130 of the SRCRM 120.

The short range wireless communication pairing process 600 begins by detecting, at 602, one or more wireless communication devices 104, 106. A determination is made, at 604, that determines whether the detected device(s) 104, 106 have already been paired with the SRCRM 120. If this determination is negative, the wireless communication device(s) 104, 106, at 606, is queried for pairing information. The requested pairing information, at 608, is received from the wireless communication device(s) 104, 106 and stored in the wireless communication device pairing data 132. A SRWC link, at 610, is then established with the wireless communication device(s) 104, 106 using the pairing information. The control then flows to 616.

If the result of the determination, at 604, is positive, the wireless communication device pairing data 132, at 612, is queried to identify pairing information associated with the wireless communication devices(s) 104, 106. The identified pairing data 132, at 614, is used to automatically establish a SRWC link with the wireless device(s) 104, 106. A SRWDS 102, at 616, is detected. SRWDS pairing information, at 618, is received for the SRWDS 102. As discussed above, the SRWDS pairing information can be obtained from the SRWDS pairing data 134 and/or can be directly entered into the SRCRM 120 by an individual. The SRWDS pairing information, at 620, is used to establish a SRWC link with the SRWDS 102, thereby linking the wireless communication device(s) 104, 106 to the SRWDS 102 through the SRCRM 120. This ends the short range wireless communication pairing process 600. It should be noted that steps 616-620 are optional.

Figure 7:
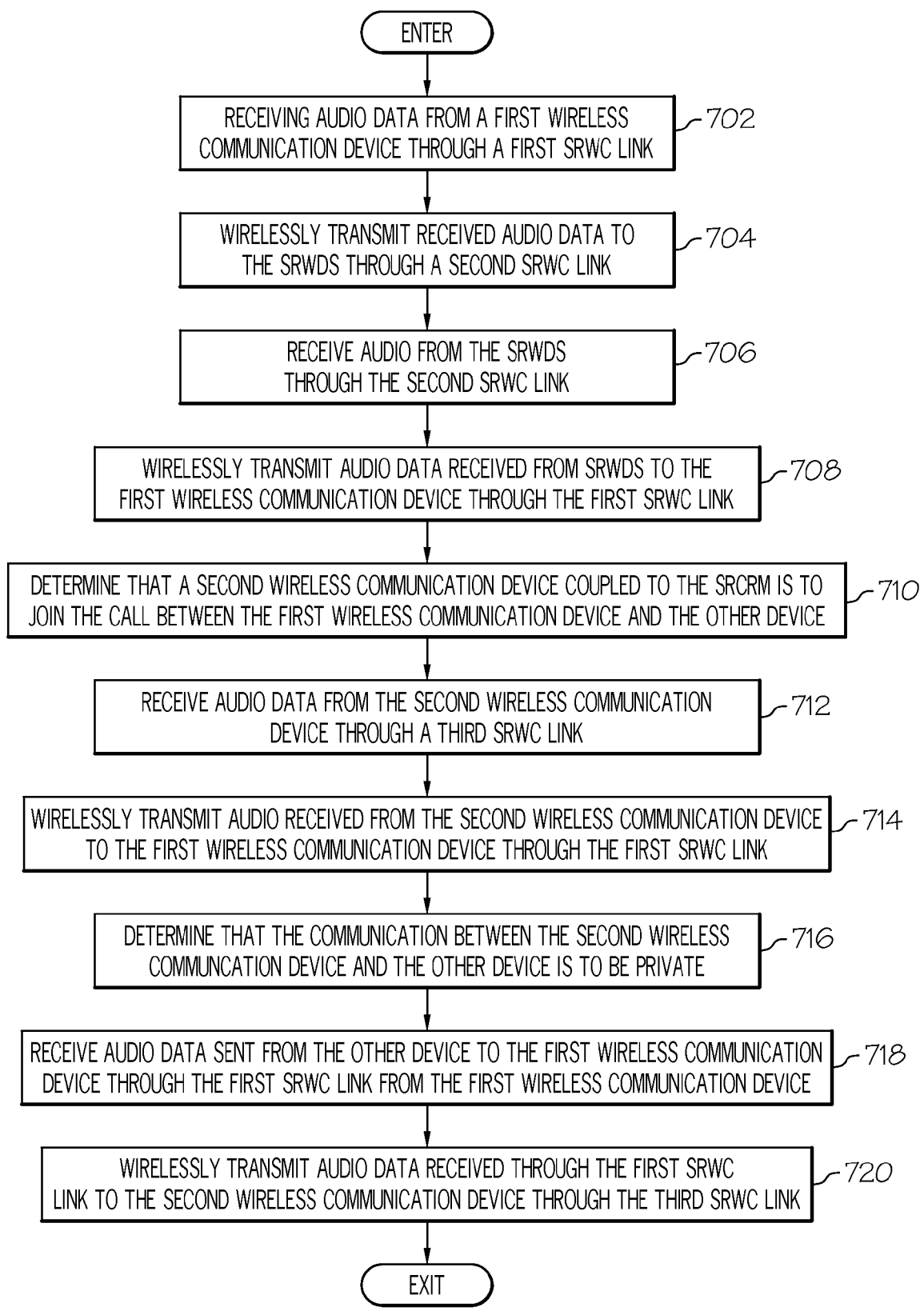
FIG. 7 is a flow diagram for a short range wireless communications relaying process performed by the short range communication relay electronic device illustrated in FIG. 1.

FIG. 7 is a flow diagram for a short range wireless communications relaying process 700. The short range wireless communications relaying process 700 automatically relays short range wireless communications between one or more wireless communication devices 104, 106 and a SRWDS 102. The short range wireless communications relaying process 700 also automatically relays short range wireless communication from one or more wireless communication devices 104, 106 to one or more other wireless communication devices 104, 106. These relaying processes have been discussed above with respect to FIGS. 1-5. The short range wireless communications relaying process 700 is performed by the communication manager 130 of the SRCRM 120.

The short range wireless communications relaying process 700 begins by receiving, at 702, audio data from a first wireless communication device 104 through a first SRWC link. The audio data being associated with a call established between the first wireless device 104 and another device over a wireless communication network, such as a cellular network. The received audio data, at 704, is wirelessly transmitted to the SRWDS 102 through a second SRWC link. The SRWDS 102 transmits the audio data through an audio device, such as a speaker. Audio data, at 706, is received from the SRWDS 102 through the second SRWC link. The received audio data, at 708, is wirelessly transmitted to the first wireless communication device 104 through the first SRWC link. The first wireless communication device 104 transmits this received audio data to the other device over the wireless communication network.

A determination, at 710, is made that a second wireless communication device 106 coupled to the SRCRM 120 is to join the call between the first wireless communication device 104 and the other device. Audio data, 712, is received from the second wireless communication device 106 through a third SRWC link. The received audio data, at 714, is wirelessly transmitted to the first wireless communication device 104 through the first SRWC link. The first wireless communication device 104 transmits this received audio data to the other device over the wireless communication network.

A determination, at 716, is made that the communication between the second wireless communication device and the other device is to be private. Audio data received by the first wireless communication device 104 from the other device, at 718, is received through the first SRWC link from the first wireless communication device 104. The received audio data, at 720, is wirelessly transmitted to the second wireless communication device 106 through the third SRWC link. This ends the short range wireless communications relaying process 700. It should be noted that if a link between the SRCRM 120 and the SRWDS 102 has not been made, the SRCRM 120 transmits data only between the wireless communication devices 104, 106.

Figure 8:
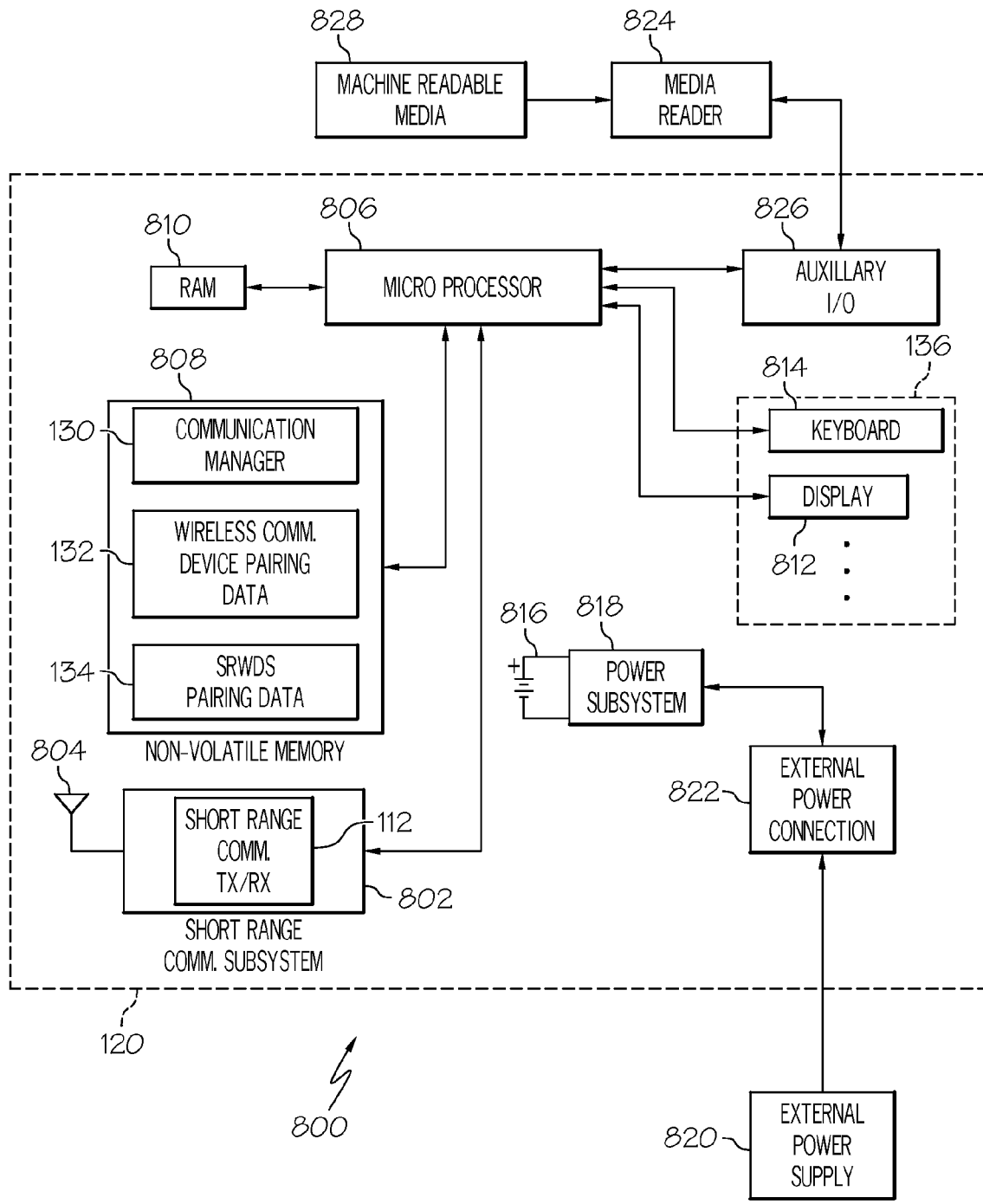
FIG. 8 is a block diagram of an electronic device and associated components in which the systems and methods disclosed herein may be implemented.

FIG. 8 is a block diagram of an exemplary electronic device and associated components 800 in which the systems and methods disclosed herein may be implemented. In this example, an electronic device 120 is a short range wireless communication relay manager device discussed above with respect to FIGS. 1-7. The illustrated electronic device 120 is an example electronic device that includes two-way wireless communications functions. Such electronic devices incorporate a short range communication subsystem 802 that comprises the short range communication transceiver 112, discussed above, and associated circuits and components such as one or more antenna elements 804.

The electronic device 120 includes a microprocessor 806 that controls the overall operation of the electronic device 120. The microprocessor 806 interacts with the above described short range communications subsystem elements and also interacts with other device subsystems such as non-volatile memory 808 (e.g., flash memory), random access memory (RAM) 810, user interfaces 136 (such as a display 812, a keyboard 814, and other similar devices), a power subsystem, and any other device subsystems.

A battery 816 is connected to a power subsystem 818 to provide power to the circuits of the electronic device 120. The power subsystem 818 includes power distribution circuitry for providing power to the electronic device 120 and also contains battery charging circuitry to manage recharging the battery 816. The external power supply 820 is able to be connected to an external power connection 822.

Operating system software used by the microprocessor 806 is stored in non-volatile memory 808. Also, the communication manager 130, wireless communication device pairing data 132, SRWDS pairing data 134 are also stored within the non-volatile memory 808. Further examples are able to use a battery backed-up RAM or other non-volatile storage data elements to store operating systems, the communication manager 130, wireless communication device pairing data 132, SRWDS pairing data 134, other executable programs, or any combination of the above. It should be noted that the communication manager 130 can also be implemented in hardware as well. The operating system software, device application software, or parts thereof, are able to be temporarily loaded into volatile data storage such as RAM 810. Data received via wireless communication signals or through wired communications are also able to be stored to RAM 810.

The microprocessor 806, in addition to its operating system functions, is able to execute software applications on the electronic device 120. A predetermined set of applications that control basic device operations, including at least data and voice communication applications, is able to be installed on the electronic device 120 during manufacture.

During wireless communication operations, a received signal such as a short range wireless communication signal is processed by the short range communication subsystem 802 and the communication manager 130, and communicated data is provided the microprocessor 806. Depending on conditions or statuses of the electronic device 120, one or more particular functions associated with a subsystem circuit may be disabled, or an entire subsystem circuit may be disabled.

A media reader 824 is able to be connected to an auxiliary I/O device 826 to allow, for example, loading computer readable program code of a computer program product into the electronic device 120 for storage into flash memory 808. In one example, computer readable program code includes instructions for performing the short range wireless communication pairing process 600 and the short range wireless communications relaying process 700, described above. One example of a media reader 824 is an optical drive such as a CD/DVD drive, which may be used to store data to and read data from a computer readable medium or storage product such as computer readable storage media 828. Examples of suitable computer readable storage media include optical storage media such as a CD or DVD, magnetic media, or any other suitable data storage device. Computer readable program code can be alternatively provided to the electronic device 120 through the short range communication subsystem 802.

Figure 9:
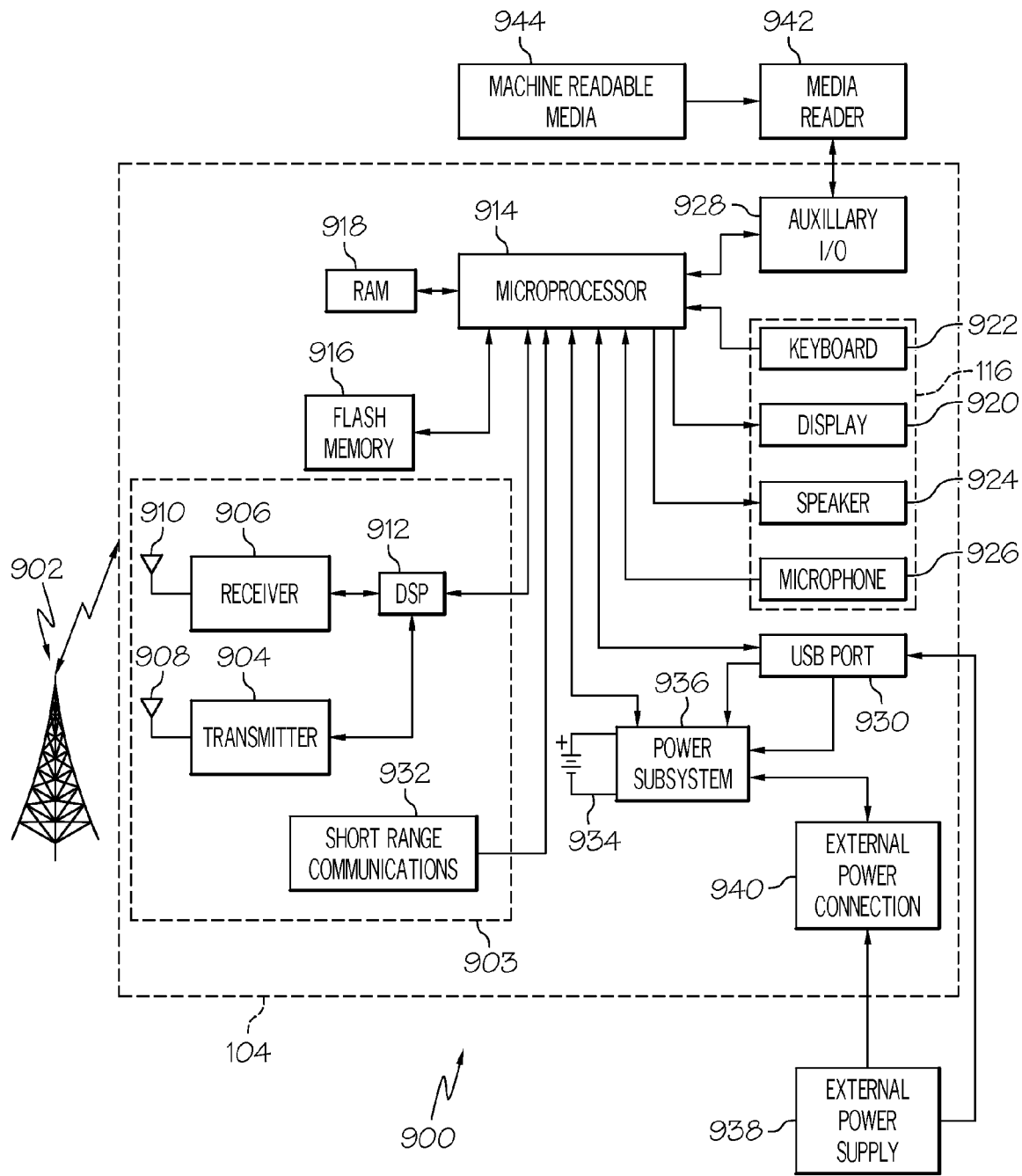
FIG. 9 is a block diagram of another electronic device and associated components in which the systems and methods disclosed herein may be implemented.

FIG. 9 is a block diagram of an exemplary electronic device and associated components 900 in which the systems and methods disclosed herein may be implemented. In this example, an electronic device 104 is a wireless two-way communication device with voice and data communication capabilities. Such electronic devices communicate with a wireless voice or data network 902 using a suitable wireless communications protocol. Wireless voice communications are performed using either an analog or digital wireless communication channel. Data communications allow the electronic device 104 to communicate with other computer systems via the Internet. Examples of electronic devices that are able to incorporate the above described systems and methods include, for example, a data messaging device, a two-way pager, a cellular telephone with data messaging capabilities, a wireless Internet appliance or a data communication device that may or may not include telephony capabilities.

The illustrated electronic device 104 is an example electronic device that includes two-way wireless communications functions. Such electronic devices incorporate a communication subsystem 903 comprising elements such as a wireless transmitter 904, a wireless receiver 906, and associated components such as one or more antenna elements 908 and 910. A digital signal processor (DSP) 912 performs processing to extract data from received wireless signals and to generate signals to be transmitted. The particular design of the communication subsystem 98 is dependent upon the communication network and associated wireless communications protocols with which the device is intended to operate.

The electronic device 104 includes a microprocessor 914 that controls the overall operation of the electronic device 104. The microprocessor 914 interacts with the above described communications subsystem elements and also interacts with other device subsystems such as flash memory 916, random access memory (RAM) 918, user interfaces 116 (such as a display 920, a keyboard 922, a speaker 924, and a microphone 926), auxiliary input/output (I/O) device 928, Universal Serial Bus (USB) Port 930, a short-range communications subsystem 932, a power subsystem 936 and any other device subsystems.

A battery 934 is connected to a power subsystem 936 to provide power to the circuits of the electronic device 104. The power subsystem 936 includes power distribution circuitry for providing power to the electronic device 104 and also contains battery charging circuitry to manage recharging the battery 934. The external power supply 938 is able to be connected to an external power connection 940 or through a USB port 930.

The USB port 930 further provides data communication between the electronic device 104 and one or more external devices, such as an information processing system. Data communication through USB port 930 enables a user to set preferences through the external device or through a software application and extends the capabilities of the device by enabling information or software exchange through direct connections between the electronic device 104 and external data sources rather than via a wireless data communication network. In addition to data communication, the USB port 930 provides power to the power subsystem 936 to charge the battery 934 or to supply power to the electronic circuits, such as microprocessor 914, of the electronic device 104.

Operating system software used by the microprocessor 914 is stored in flash memory 916. Further examples are able to use a battery backed-up RAM or other non-volatile storage data elements to store operating systems, other executable programs, or both. The operating system software, device application software, or parts thereof, are able to be temporarily loaded into volatile data storage such as RAM 918. Data received via wireless communication signals or through wired communications are also able to be stored to RAM 918.

The microprocessor 914, in addition to its operating system functions, is able to execute software applications on the electronic device 104. A predetermined set of applications that control basic device operations, including at least data and voice communication applications, is able to be installed on the electronic device 104 during manufacture. Examples of applications that are able to be loaded onto the device may be a personal information manager (PIM) application having the ability to organize and manage data items relating to the device user, such as, but not limited to, e-mail, calendar events, voice mails, appointments, and task items.

Further applications may also be loaded onto the electronic device 104 through, for example, the wireless network 902, an auxiliary I/O device 928, USB port 930, short-range communications subsystem 932, or any combination of these interfaces. Such applications are then able to be installed by a user in the RAM 918 or a non-volatile storage for execution by the microprocessor 914.

In a data communication mode, a received signal such as a text message or web page download is processed by the communication subsystem, including wireless receiver 906 and wireless transmitter 904, and communicated data is provided the microprocessor 914, which is able to further process the received data for output to the display 920, or alternatively, to an auxiliary I/O device 928 or the USB port 930. A user of the electronic device 104 may also compose data items, such as e-mail messages, using the keyboard 922, which is able to include a complete alphanumeric keyboard or a telephone-type keypad, in conjunction with the display 920 and possibly an auxiliary I/O device 928. Such composed items are then able to be transmitted over a communication network through the communication subsystem.

For voice communications, overall operation of the electronic device 104 is substantially similar, except that received signals are generally provided to a speaker 924 and signals for transmission are generally produced by a microphone 926. Alternative voice or audio I/O subsystems, such as a voice message recording subsystem, may also be implemented on the electronic device 104. Although voice or audio signal output is generally accomplished primarily through the speaker 924, the display 920 may also be used to provide an indication of the identity of a calling party, the duration of a voice call, or other voice call related information, for example.

Depending on conditions or statuses of the electronic device 104, one or more particular functions associated with a subsystem circuit may be disabled, or an entire subsystem circuit may be disabled. For example, if the battery temperature is low, then voice functions may be disabled, but data communications, such as e-mail, may still be enabled over the communication subsystem.

A short-range communications subsystem 932 provides for communication between the electronic device 104 and different systems or devices, which need not necessarily be similar devices as discussed above. The short-range communications subsystem 932 comprises the short range communication transceiver 112 and optionally and associated circuits and components and optionally an infrared device.

A media reader 942 is able to be connected to an auxiliary I/O device 928 to allow, for example, loading computer readable program code of a computer program product into the electronic device 104 for storage into flash memory 916. One example of a media reader 942 is an optical drive such as a CD/DVD drive, which may be used to store data to and read data from a computer readable medium or storage product such as computer readable storage media 944. Examples of suitable computer readable storage media include optical storage media such as a CD or DVD, magnetic media, or any other suitable data storage device. Media reader 942 is alternatively able to be connected to the electronic device through the USB port 930 or computer readable program code is alternatively able to be provided to the electronic device 104 through the wireless network 902.

Information Processing System

The present subject matter can be realized in hardware, software, or a combination of hardware and software. A system can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein.

The present subject matter can also be embedded in a computer program product, which comprises all the features enabling the implementation of the methods described herein, and which—when loaded in a computer system—is able to carry out these methods. Computer program in the present context means any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include computer readable storage medium embodying non-volatile memory, such as read-only memory (ROM), flash memory, disk drive memory, CD-ROM, and other permanent storage. Additionally, a computer medium may include volatile storage such as RAM, buffers, cache memory, and network circuits. Furthermore, the computer readable medium may comprise computer readable information in a transitory state medium such as a network link and/or a network interface, including a wired network or a wireless network that allow a computer to read such computer readable information.

NON-LIMITING EXAMPLES

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

What is claimed is:

1. A method with a communication relay module, the method comprising:
   establishing a first short range wireless communication link with a first wireless communication device, the first wireless communication device maintaining a wireless connection to a wireless telecommunications network;
   establishing a second short range wireless communication link with at least a second wireless communication device;
   receiving at least one of
      a first set of short range wireless communication data from the first wireless communication device over the first short range wireless communication link, and
      a second set of short range wireless communication data from the second wireless communication device over the second short range wireless communication; and
   relaying at least one of
      the first set of short range wireless communication data that has been received to the second wireless communication device over the second short range wireless communication link,
      the second set of short range wireless communication data that has been received to the first wireless communication device over the first short range wireless communication link,
   the relaying forming a multi-party connection with the first wireless communication device and the second wireless communication device to the wireless telecommunications network;
   establishing at least a third short range wireless communication link with a short range wireless data system;
   receiving a privacy instruction from the first wireless communication device to prevent routing of the first set of short range wireless communication data to the short range wireless data system;
   preventing, in response to receiving the privacy instruction, the first set of short range wireless communication data to the short range wireless data system; and
   routing, in response to receiving the privacy instruction, the first set of short range wireless communication data to the second wireless communication device over the second short range wireless communication link.

2. A method with a communication relay module, the method comprising:
   establishing a first short range wireless communication link with a first wireless communication device, the first wireless communication device maintaining a wireless connection to a cellular telecommunications network;
   establishing a second short range wireless communication link with at least a second wireless communication device;
   establishing at least a third short range wireless communication link with a short range wireless data system;
   receiving at least one of
      a first set of short range wireless communication data from the first wireless communication device over the first short range wireless communication link, and
      a second set of short range wireless communication data from the second wireless communication device over the second short range wireless communication; and
   relaying at least one of
      the first set of short range wireless communication data that has been received to the second wireless communication device over the second short range wireless communication link, and
      the second set of short range wireless communication data that has been received to the first wireless communication device over the first short range wireless communication link,
   the relaying forming a multi-party connection with the first wireless communication device and the second wireless communication device to the cellular telecommunications network;
   receiving a privacy instruction from the first wireless communication device to prevent routing of the first set of short range wireless communication data to the short range wireless data system;
   receiving a privacy instruction from the second wireless to prevent routing of the first set of short range wireless communication data to the short range wireless data system;
   preventing, in response to privacy receiving the instruction, the second set of short range wireless communication data to the short range wireless data system; and
   routing, in response to privacy receiving the instruction, the first set of short range wireless communication data to the second wireless communication device over the second short range wireless communication link.

3. The method of claim 2, further comprising:
   relaying the first set of short range wireless communication data that has been received to the short range wireless data system over the third short range wireless communication link.

4. The method of claim 2, the relaying being performed while maintaining the third short range wireless communication link with the short range wireless data system.

5. The method of claim 2, the short range wireless data system is one of a Bluetooth® system and a Zigbee® system.

6. The method of claim 2, the first set of short range wireless communication data comprising wireless communication data received by the first wireless communication device from an electronic device communicatively coupled to the first wireless communication device through cellular telecommunications network.

7. The method of claim 2, the second set of short range wireless communication data comprising data entered at the second wireless communication device through a user interface associated with the second wireless communication device.

8. The method of claim 6, the relaying of the first set of short range wireless communication data further comprises:
   receiving an instruction from the first wireless communication device to transmit wireless communication data received by the first wireless communication device from the electronic device to the second wireless communication device; and performing this relaying in response to receiving the instruction.

9. An electronic device for relaying short range communication data between other electronic devices, the electronic device comprising:

a processor;

a memory communicatively coupled to the processor;

a wireless transceiver communicatively coupled to the processor and the memory;

a communication manager communicatively coupled to the processor, the memory and the wireless transceiver, the communication manager configured to perform a method comprising:

establishing a first short range wireless communication link with a first wireless communication device, the first wireless communication device including a wireless connection to a cellular telecommunications network;

establishing a second short range wireless communication link with at least a second wireless communication device;

establishing at least a third short range wireless communication link with a short range wireless data system;

receiving at least one of a first set of short range wireless communication data from the first wireless communication device over the first short range wireless communication link, and a second set of short range wireless communication data from the second wireless communication device over the second short range wireless communication; and relaying at least one of the first set of short range wireless communication data that has been received to the second wireless communication device over the second short range wireless communication link, and the second set of short range wireless communication data that has been received to the first wireless communication device over the first short range wireless communication link, this relaying forming a multi-party connection with the first wireless communication device and the second wireless communication device to the cellular telecommunications network;

receiving a privacy instruction from the first wireless communication device to prevent routing of the first set of short range wireless communication data to the short range wireless data system;

preventing, in response to receiving the privacy instruction, the first set of short range wireless communication data to the short range wireless data system; and routing, in response to receiving the privacy instruction, the first set of short range wireless communication data to the second wireless communication device over the second short range wireless communication link.

10. The electronic device of claim 9, the first set of short range wireless communication data comprising wireless communication data received by the first wireless communication device from an electronic device communicatively coupled to the first wireless communication device through cellular telecommunications network.

11. The electronic device of claim 10, the relaying of the first set of short range wireless communication data further comprises:

receiving an instruction from the first wireless communication device to transmit wireless communication data received by the first wireless communication device from the electronic device to the second wireless communication device; and performing this relaying in response to receiving the instruction.

12. The electronic device of claim 9, the second set of short range wireless communication data comprising data entered at the second wireless communication device through a user interface associated with the second wireless communication device.

13. The electronic device of claim 9, the method further comprising:

receiving a privacy instruction from the second wireless to prevent routing of the first set of short range wireless communication data to the short range wireless data system;

preventing, in response to receiving the privacy instruction, the second set of short range wireless communication data to the short range wireless data system; and routing, in response to receiving the privacy instruction, the first set of short range wireless communication data to the second wireless communication device over the second short range wireless communication link.

14. A computer program product for relaying short range communication data between electronic devices, the computer program product comprising:

a non-transitory computer readable storage medium having computer readable program code embodied therewith, the computer readable program code comprising instructions for performing a method comprising:

establishing a first short range wireless communication link with a first wireless communication device, the first wireless communication device including a wireless connection to a cellular telecommunications network;

establishing a second short range wireless communication link with at least a second wireless communication device;

establishing at least a third short range wireless communication link with a short range wireless data system;

receiving at least one of a first set of short range wireless communication data from the first wireless communication device over the first short range wireless communication link, and a second set of short range wireless communication data from the second wireless communication device over the second short range wireless communication; and relaying at least one of the first set of short range wireless communication data that has been received to the second wireless communication device over the second short range wireless communication link, and the second set of short range wireless communication data that has been received to the first wireless communication device over the first short range wireless communication link, this relaying forming a multi-party connection with the first wireless communication device and the second wireless communication device to the cellular telecommunications network;

receiving a privacy instruction from the first wireless communication device to prevent routing of the first set of short range wireless communication data to the short range wireless data system;

preventing, in response to receiving the privacy instruction, the first set of short range wireless communication data to the short range wireless data system; and routing, in response to receiving the privacy instruction, the first set of short range wireless communication data to the second wireless communication device over the second short range wireless communication link.

15. The computer program product of claim 14, the first set of short range wireless communication data comprising wireless communication data received by the first wireless communication device from an electronic device communicatively coupled to the first wireless communication device through cellular telecommunications network.

16. The computer program product of claim 15, the relaying of the first set of short range wireless communication data further comprises:

receiving an instruction from the first wireless communication device to transmit wireless communication data received by the first wireless communication device from the electronic device to the second wireless communication device; and performing this relaying in response to receiving the instruction.

\* \* \* \* \*